United States Patent
Mi et al.

(10) Patent No.: US 9,020,883 B2
(45) Date of Patent: Apr. 28, 2015

(54) SYSTEM AND METHOD TO PROVIDE BPEL SUPPORT FOR CORRELATION AGGREGATION

(75) Inventors: Glenn Mi, Saratoga, CA (US); Yogesh Kumar, Sunnyvale, CA (US)

(73) Assignee: Oracle International Corporation, Redwood Shores, CA (US)

(*) Notice: Subject to any disclaimer, the term of this patent is extended or adjusted under 35 U.S.C. 154(b) by 413 days.

(21) Appl. No.: 13/477,892

(22) Filed: May 22, 2012

(65) Prior Publication Data

US 2013/0219412 A1   Aug. 22, 2013

Related U.S. Application Data

(60) Provisional application No. 61/601,987, filed on Feb. 22, 2012.

(51) Int. Cl.
    G06F 17/30    (2006.01)
    *G06Q 10/06*  (2012.01)
    H04L 29/08    (2006.01)

(52) U.S. Cl.
    CPC .......... *G06Q 10/06* (2013.01); *G06F 17/30563* (2013.01); H04L 67/2814 (2013.01); *H04L 67/2819* (2013.01)

(58) Field of Classification Search
    CPC ............................................... G06F 17/30563
    USPC ......................................................... 707/602
    See application file for complete search history.

(56) References Cited

U.S. PATENT DOCUMENTS

| | | |
|---|---|---|
| 5,721,913 A | 2/1998 | Ackroff et al. |
| 5,978,836 A | 11/1999 | Ouchi |
| 6,003,011 A | 12/1999 | Sarin et al. |
| 6,161,113 A | 12/2000 | Mora et al. |
| 6,170,002 B1 | 1/2001 | Ouchi |
| 6,507,845 B1 | 1/2003 | Cohen et al. |
| 6,574,736 B1 | 6/2003 | Andrews |
| 6,606,740 B1 | 8/2003 | Lynn et al. |
| 6,742,015 B1 | 5/2004 | Bowman-Amuah |

(Continued)

OTHER PUBLICATIONS

Kloppmann, M.; Konig, D.; Leymann, F.; Pfau, G.; Roller, D., "Business process choreography in WebSphere: Combining the power of BPEL and J2EE," (2000) IBM Systems Journal, vol. 43, No. 2, pp. 270-296 [retrieved from http://ieeexplore.ieee.org/stamp/stamp.jsp?tp=&arnumber=5386791&isnumber=5386781].*

(Continued)

*Primary Examiner* — Brian W Wathen
(74) *Attorney, Agent, or Firm* — Meyer IP Law Group

(57) ABSTRACT

A system and method are disclosed for providing BPEL support for correlation aggregation. The system can comprise a business process engine, executing on one or more application servers organized in a cluster. The system can comprise a database including a table which stores records relating to message groups and business process instances. When a message is received by the business process engine, the business process engine can determine an identity associated with the message, and check the database to determine if there is an entry associated with the identity. If there is no entry associated with the identity, then the business process engine can instantiate a first business process instance associated with the identity, and if there is an entry associated with the identity, then the business process engine can route the message to a business process instance associated with the identity.

20 Claims, 3 Drawing Sheets

(56) References Cited

U.S. PATENT DOCUMENTS

| | | |
|---|---|---|
| 6,889,231 B1 | 5/2005 | Souder et al. |
| 6,895,573 B2 | 5/2005 | Norgaard et al. |
| 6,970,844 B1 | 11/2005 | Bierenbaum |
| 7,020,697 B1 | 3/2006 | Goodman et al. |
| 7,062,749 B2 | 6/2006 | Cyr et al. |
| 7,124,192 B2 | 10/2006 | High et al. |
| 7,174,514 B2 | 2/2007 | Subramaniam et al. |
| 7,289,966 B2 | 10/2007 | Ouchi |
| 7,403,989 B2 | 7/2008 | Beringer et al. |
| 7,406,432 B1 | 7/2008 | Motoyama |
| 7,428,495 B2 | 9/2008 | Dhar et al. |
| 7,448,046 B2 | 11/2008 | Navani et al. |
| 7,451,477 B2 | 11/2008 | Griffin et al. |
| 7,464,366 B2 | 12/2008 | Shukla et al. |
| 7,493,593 B2 | 2/2009 | Koehler |
| 7,519,711 B2 | 4/2009 | Mohindra et al. |
| 7,603,674 B2 | 10/2009 | Cyr et al. |
| 7,631,291 B2 | 12/2009 | Shukla et al. |
| 7,644,432 B2 | 1/2010 | Patrick et al. |
| 7,676,483 B2 | 3/2010 | Klug |
| 7,680,683 B2 | 3/2010 | Kilerio et al. |
| 7,685,604 B2 | 3/2010 | Baartman et al. |
| 7,689,562 B2 | 3/2010 | Shaad et al. |
| 7,702,736 B2 | 4/2010 | Ouchi |
| 7,814,142 B2 | 10/2010 | Mamou et al. |
| 7,925,527 B1 | 4/2011 | Flam |
| 7,953,696 B2 | 5/2011 | Davis et al. |
| 8,046,747 B2 | 10/2011 | Cyr et al. |
| 8,069,439 B2 | 11/2011 | Shukla et al. |
| 8,146,083 B2 | 3/2012 | Aggarwal et al. |
| 2002/0178119 A1 | 11/2002 | Griffin et al. |
| 2003/0135384 A1 | 7/2003 | Nguyen |
| 2003/0158832 A1 | 8/2003 | Sijacic et al. |
| 2003/0217094 A1* | 11/2003 | Andrews et al. ............. 709/201 |
| 2004/0230466 A1 | 11/2004 | Davis et al. |
| 2005/0027585 A1 | 2/2005 | Wodtke et al. |
| 2005/0049924 A1 | 3/2005 | DeBettencourt et al. |
| 2005/0071347 A1 | 3/2005 | Chau et al. |
| 2006/0069995 A1 | 3/2006 | Thompson et al. |
| 2006/0074703 A1 | 4/2006 | Bhandarkar et al. |
| 2006/0074734 A1 | 4/2006 | Shukla et al. |
| 2006/0074915 A1 | 4/2006 | Bhandarkar et al. |
| 2007/0016465 A1 | 1/2007 | Schaad |
| 2007/0240112 A1 | 10/2007 | Haselden et al. |
| 2007/0276715 A1 | 11/2007 | Beringer et al. |
| 2008/0065656 A1 | 3/2008 | Theeten et al. |
| 2008/0301684 A1 | 12/2008 | Barros et al. |
| 2009/0125366 A1 | 5/2009 | Chakraborty et al. |
| 2009/0164985 A1 | 6/2009 | Balko et al. |
| 2009/0260021 A1 | 10/2009 | Haenel et al. |
| 2010/0100427 A1 | 4/2010 | McKeown et al. |
| 2010/0106546 A1 | 4/2010 | Sproule |
| 2010/0235213 A1 | 9/2010 | Channabasavaiah et al. |
| 2010/0251242 A1 | 9/2010 | Sivasubramanian et al. |

OTHER PUBLICATIONS

Bradshaw, Deanna et al., Oracle BPEL Process Manager Developer's Guide 10g (10.1.3.1.0) Oracle, Jan. 2007.

Beecher, Virginia et al., Oracle Fusion Middleware Developer's Guide for Oracle SOA Suite, 11g Oracle, Dec. 2009.

Fogel, Steve et al., Oracle Database Administrator's Guide 11g Oracle, Mar. 2008.

Oracle BPEL Process Manager—Data Sheet Oracle, 2009.

Rittman, Mark, Oracle Purchases Collaxa, Launchs Oracle BPEL Processs Manager RittmanMead.com, Jun. 30, 2004.

Clugage, Kevin et al., The Oracle BPEL Process Manager: BPEL + Human Workflow Oracle, Mar. 14, 2006.

BPEL4People—wikipedia definition Wikipedia.org, Retrieved Apr. 10, 2012.

Kloppmann, Matthias et al., WS-BPEL Extension for People—BPEL4People IBM, SAP, White paper, Jul. 2005.

Collaxa WSOS 2.0: An introduction Collaxa, Sep. 6, 2002.

Kennedy, Mark, Oracle BPEL Process Manager Quick Start Guide, 10g Oracle, Sep. 2006.

Liu, Sa, Business Process Automation and Web Service Choreography Technische Universitat Hamburn-Harburg, Jun. 29, 2004.

Collaxa—Orchestration Server Developer's Guide Version 2.0 Beta 2 Collaxa, 2002.

Kloppmann, Matthias et al., WS-BPEL Extension for Sub-Processes—BPEL SPE IBm, SAP, Sep. 2005.

Agrawal, Ashish et al., Web Service Human Task (WS-HumanTask), Version 1.0 Active Endpoints, Inc., 2007.

Agrawal, Ashish et al., WS-BPEL Extension for People (BPEL4People), Version 1.0 Active Endpoints, Inc., 2007.

\* cited by examiner

SYSTEM AND METHOD TO PROVIDE BPEL SUPPORT FOR CORRELATION AGGREGATION

CLAIM OF PRIORITY

This application claims benefit to the following U.S. Provisional Patent Application: U.S. Provisional Patent Application No. 61/601,987 entitled "SYSTEM AND METHOD TO PROVIDE BPEL SUPPORT FOR CORRELATION AGGREGATION," by Glenn Mi et al., filed Feb. 22, 2012.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates to business processes and in particular to a system and method to provide BPEL support for correlation aggregation.

BACKGROUND

Business Process Execution Language (BPEL) is an industry specification for describing business processes. BPEL is a conversational-based system, this means that if two partners are communicating, they have to know what they are communicating about. Thus unsolicited messages are not supported, partners can only receive messages for which they are waiting. A BPEL process can be initiated via a message as well as receive messages after it is initiated. A BPEL engine determines if an incoming message is to either instantiate an instance or be routed to an existing instance by looking at the operation name. Therefore a process cannot have an initial receive and a mid-process receive using the same operation.

SUMMARY

A system and method are disclosed for providing BPEL support for correlation aggregation. One such system can comprise a business process engine, executing on one or more application servers organized in a cluster, wherein each application server executes on one or more microprocessors. The system can further comprise a database including a table which stores records relating to message groups and business process instances. When a message is received by the business process engine, the business process engine can determine an identity associated with the message, and check the database to determine if there is an entry associated with the identity. If there is no entry associated with the identity, then the business process engine can instantiate a first business process instance associated with the identity, and if there is an entry associated with the identity, then the business process engine can route the message to a business process instance associated with the identity.

In accordance with an embodiment of the invention, a plurality of messages can be received which all use the same operation and also share some common identity in the message content. The first message from the plurality of messages that is received can instantiate a new instance and the rest of the messages can be routed to the new instance.

DETAILED DESCRIPTION

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

BPEL is a conversational-based system in which partners who are communicating need to know what they are communicating about. In a typical business process, data, in the form of messages, needs to be collected from a plurality of partners, e.g., a customer, a service provider, etc. To begin this process, a message is received which creates a new instance of the business process. The business process can include mid-process receive activities, which enable the process to wait and collect messages from the other partners before completing processing. However, the first message received by the system is not necessarily the "first" message, i.e., the message the business process is waiting for to initiate processing. As such, other messages may be held by the system while the system waits for the "first" message to begin processing. In many environments, this adds unnecessary delay to the business process. For example, a business process can be used in the insurance industry to open a claim and gather information related to that claim. In this scenario, partners may include a claims adjuster, an appraiser, the insured customer, etc. Messages from these partners may not always be received in the same order, so if the business process is only configured to wait for a message from the customer to open a claim, the business process may be left waiting while it receives messages from other partners. In such a scenario, the business process should be initiated when any message from a partner is received, rather than a particular "first" message.

In accordance with an embodiment of the invention, a plurality of messages can be received which all use the same operation and also share some common identity in the message content. The first message from the plurality of messages that is received can instantiate a new instance and the rest of the messages can be routed to the instance instantiated.

Figure 1:
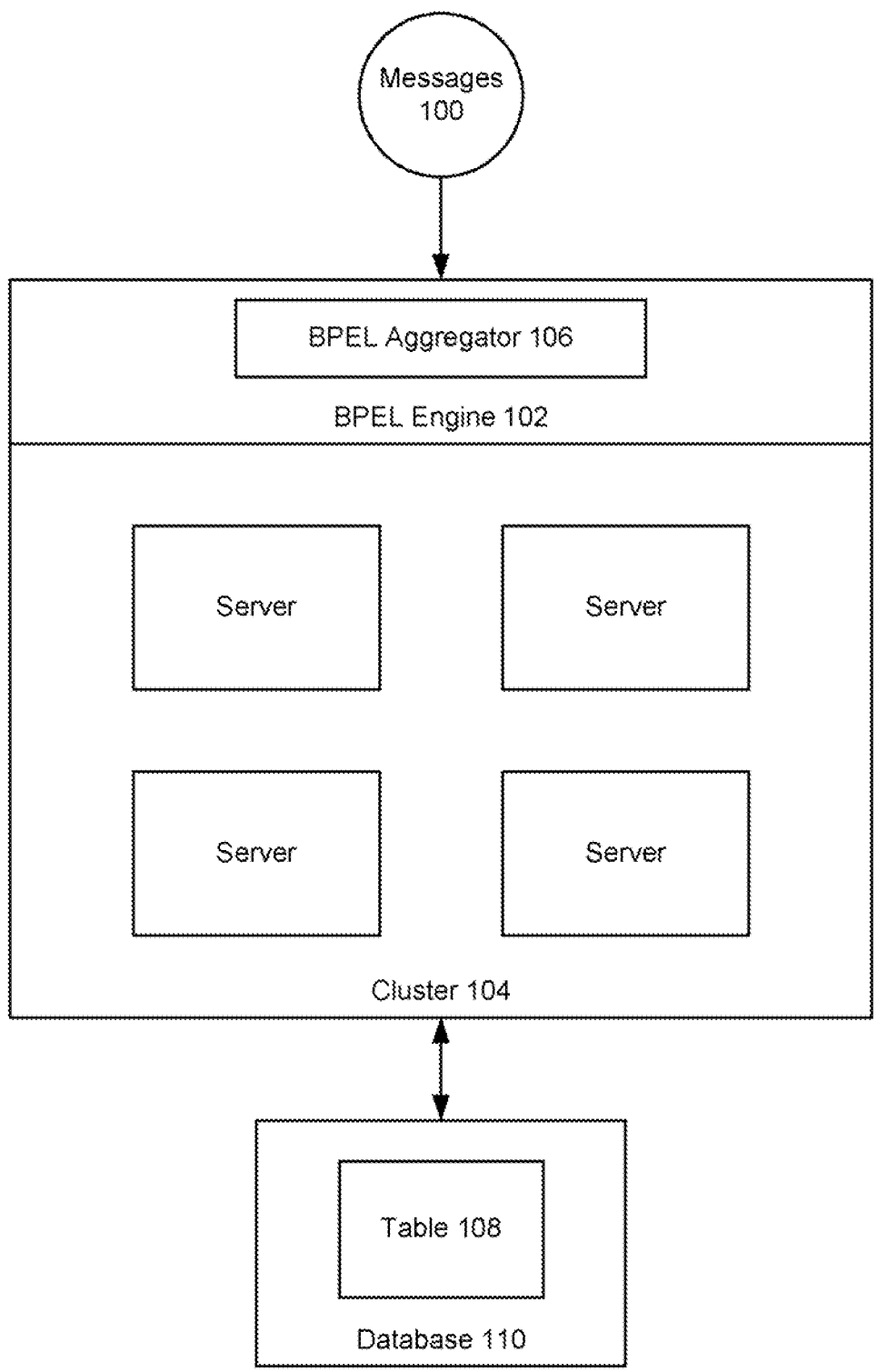
FIG. 1 shows a system for providing BPEL support for correlation aggregation, in accordance with an embodiment of the invention.

FIG. 1 shows a system for providing BPEL support for correlation aggregation, in accordance with an embodiment of the invention. As shown in FIG. 1, a plurality of messages 100 can be received at a business process engine, such as BPEL engine 102, executing on a server cluster 104, such as a SOA server cluster. A BPEL aggregator 106 can process the messages as they are received and aggregate the messages in a table 108 in database 110. The BPEL aggregator can aggregate the messages according to a common identity which is shared by related messages. Additionally, the related messages can each use the same operation. The first message received from the plurality of messages, which may not have been the first message sent, can instantiate a new instance of a business process, and the rest of the messages can be routed to the newly instantiated instance of the business process. Thus, unlike previous systems which required a designated "first" message to be received before processing can begin, in embodiments of the present invention, whichever message is received first can instantiate a new instance of a business process without being designated as the "first" message.

To support this operation, a new database table 108 can be created to store a record for each of these message groups. When a first message comes in, having a first identity, a new row can be populated in the table associated with this identity. When subsequent messages come in for the same group, which share the first identity, the engine can detect the existence of the record in that table and can route the messages to the existing instance. When a first message for a different group comes in, having a second identity, another new row can be populated in the table and subsequent messages associated with that group, which share the second identity, can be routed to the new instance. As used herein, the first message for a particular message group refers to the first message received and processed by the BPEL engine, even though this may not be the first message sent for this group. Thus, when a series of messages for a message group are sent, whichever is the first to be received and processed by the BPEL engine is the "first message" regardless of the order in which those messages were created and/or sent. Additionally, for a BPEL process using correlation, the same operation (or eventName) is allowed to be used in entry receive and mid-process receive.

In accordance with an embodiment of the invention, the common identity shared by the groups of messages can be the BPEL correlationSet value, which can be stored as part of a primary key in a table. This can ensure that one record is created for a message group. Using the database to coordinate receives of these messages also enables the solution to work across multiple nodes in a server cluster. The synchronization of related messages can be performed at the database layer, which enables the system to work in a clustered environment.

Figure 2:
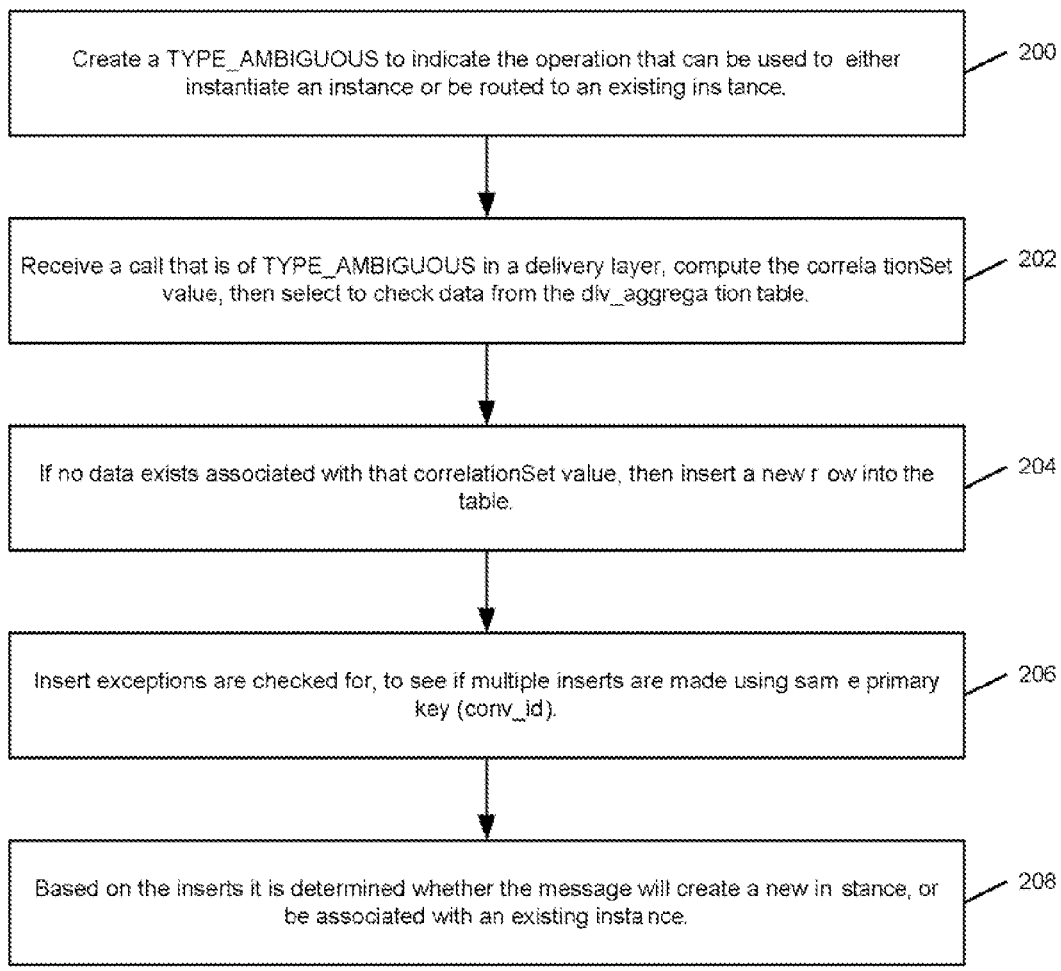
FIG. 2 shows a method for providing BPEL support for correlation aggregation, in accordance with an embodiment of the invention.

FIG. 2 shows a method for providing BPEL support for correlation aggregation, in accordance with an embodiment of the invention. At step 200, a type, such as TYPE_AMBIGUOUS, is created which indicates that an operation (or eventName) can be used to either instantiate a new instance of a business process, or be routed to an existing instance of the business process. At step 202, a call that is of TYPE_AMBIGUOUS is received at the BPEL engine via a delivery layer, and a correlationSet value for the call is determined based on an identity of the message. Using the correlationSet value, data from the table 108, for example the dlv_aggregation table, in the database 110 is checked. At step 204, if no data exists associated with that correlationSet value, then a new row is inserted into the table 108. At step 206, insert exceptions are checked for, to see if multiple inserts are made using same primary key (conv_id). At step 208, based on the insert exceptions it is determined whether the message will create a new instance, or be associated with an existing instance. An insert into a CORRELATION_GROUP table indicates this messages will create a new instance, the message is then marked as TYPE_INVOKE and processed accordingly. A failed insertion or existing correlation set indicates this message will cause a mid-process receive, the message is then marked as TYPE_CALLBACK and processed accordingly.

In accordance with an embodiment of the invention, during static analysis of a BPEL process, operations (or eventNames) are identified that are used in both entry receives and mid-process receives. For a BPEL process using correlation, a new message is always routed to either a new instance or an existing instance. Additionally, the engine performs the message routing. The message can be an invoke message creating a new instance or a callback message continuing an existing instance.

Figure 3:
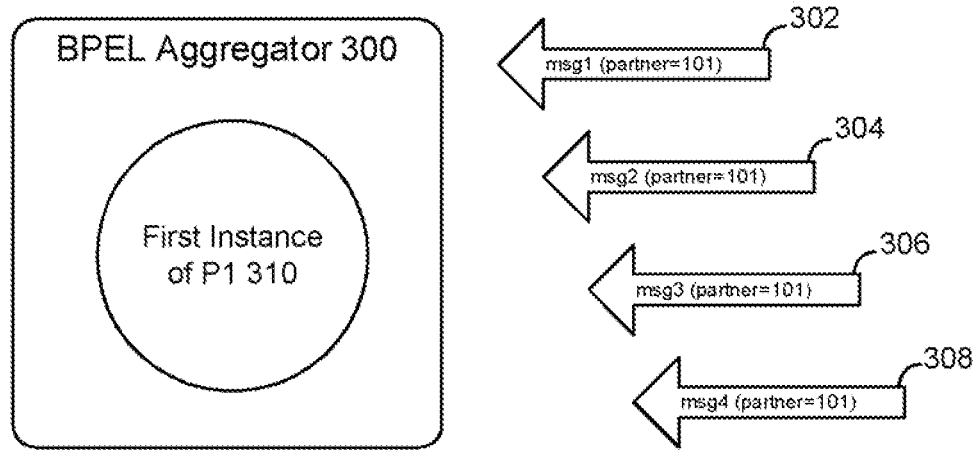
FIG. 3 shows a diagram of a system for providing BPEL support for correlation aggregation, in accordance with an embodiment of the invention.

FIG. 3 shows a diagram of a system for providing BPEL support for correlation aggregation, in accordance with an embodiment of the invention. In the process shown in FIG. 3, four messages are provided to the BPEL aggregator 300 by one or more partners (msg1 302, msg2 304, msg3 306, msg4 308), each having the same identity (in this example the correlation ID is partner=101). When the first message, msg1 302, is received, the BPEL engine can check the table 108 to determine whether there is already an instance of a business process associated with msg1's correlation ID. Since msg1 302 is the first message received in this group, there is not a current instance and a new instance of a BPEL process P1 310 is instantiated. The BPEL engine then marks msg1 as the invoke message. Each of the remaining messages, msg2 304, msg3 306, and msg4 308, are received using Continue_Receive activity and are marked as callback messages. As each message is received, that message's correlation ID is determined and, since instance P1 310 has already been instantiated, that message is routed to P1. For each message, P1 performs another iteration of the business process, up to a set number of iterations, specific to the business process. The instance closes after the set number of iterations have been performed; the business process having completed its processing.

Figure 4:
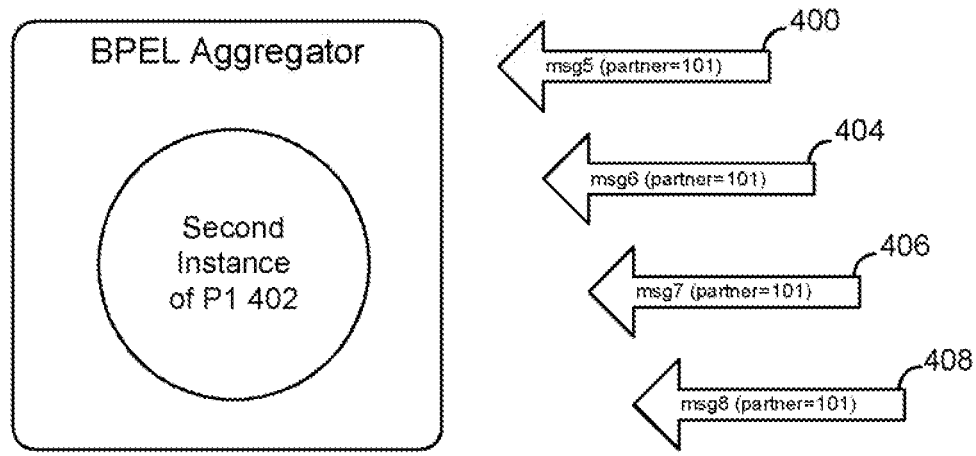
FIG. 4 shows a diagram of a system for providing BPEL support for correlation aggregation, in accordance with an embodiment of the invention.

FIG. 4 shows a diagram of a system for providing BPEL support for correlation aggregation, in accordance with an embodiment of the invention. If after the instance P1 310 has closed a partner provides a fifth message, msg5 400, for same correlation ID (partner=101), a number of scenarios are possible. As shown in FIG. 4, when this new message, msg5 400, is received a new instance of P1 402 should be created since there is no currently active instance of P1. This second instance of P1 402 can then wait on the Continue_Receive activity for additional messages (msg6 404, msg7 406, and msg8 408) to perform a set number of iterations of the business process. Additionally, the process could have business logic to initiate a new instance and use business logic to terminate as all message aggregation is complete. Processing proceeds similarly to that shown in FIG. 3, with each subsequent message being routed to the second instance of P1 402 and the second instance closing after the set number of iterations have been performed.

In accordance with an embodiment of the invention, error conditions can be encountered under some circumstances. For example, if msg4 308 and msg5 400 are received in close succession, the system can experience a race condition. This is possible where msg4 closes the first instance of P1 310, but the engine routes msg5 400 as callback to that instance instead of creating a new second instance of P1 402. In this case, if a sixth message, msg6 404, arrives, the engine will route this to the entry receive of the new second instance of P1 402. While the new instance of P1 iterates, additional messages, such as msg7 406, and msg8 408, can be routed to the second instance of P1 402 via the Continue_Receive activity. However, because, in this example, msg5 initially got routed to a closed instance of P1 310 (which was closed by msg4 308), msg5 could not be handled. Processing of msg5 then falls to the "Recovery" part of the BPEL engine, which can routed msg5 to Continue_Receive.

In another example of an error condition, if expected messages (for example msg6 404, msg7 406 and msg8 408) are not received, then msg5 400 becomes an unhandled callback message waiting for a subscriber. An engine recovery module can try to process this message and fail as there is no subscriber available.

To deal with these error scenarios a number of options are available. For example, a limit can be placed on recovery of callback messages using maxRecoverAttempt. This count specifies the number of attempts auto recovery will make to recover an invoke/callback message. Once the number of recover attempts exceeds this count, the state of message is changes to "exhausted".

Additionally, a custom SQL script could be written to check for following criteriaCallback is in state=0. Correlation value for this callback exists in CORRELATION_GROUP in closed state (state=0). This indicates the callback is marked for a closed aggregation instance. Users can choose to cancel/purge these instances based on business logic.

In accordance with an embodiment of the invention, BPEL is designed as a conversation based system. As such, it does not handle unsolicited messages, the application is always aware of the messages coming as part of correlation aggregation and chooses to subscribe and process or ignore the message according to business needs.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. The transmission may include a plurality of separate transmissions. In accordance with certain embodiments, however, the computer storage medium containing the instructions is non-transitory (i.e. not in the process of being transmitted) but rather is persisted on a physical device.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A system for providing BPEL support for correlation aggregation, comprising:
    a business process engine, executing on one or more application servers organized in a cluster, wherein each application server executes on one or more microprocessors;
    a database including a table which stores records relating to message groups and business process instances; and
    wherein, when a message is received by the business process engine, the business process engine is configured to,
        determine an identity associated with the message,
        check the database to determine if there is an entry associated with the identity,
        if there is no entry associated with the identity, then mark the message as a business process instantiating message, and instantiate a first business process instance associated with the identity, and
        if there is an entry associated with the identity, then route the message to a business process instance associated with the identity.

2. The system of claim 1, further comprising:
    a business process aggregator, at the business process engine, which is operable to route the messages received by the business process engine.

3. The system of claim 1, wherein the identity is a correlation ID.

4. The system of claim 1, wherein the message is of a type which can instantiate a new business process instance or be routed to an existing business process instance mid-process.

5. The system of claim 1, wherein when subsequent messages are received by the business process engine which share the identity with the message, the business process engine routes the subsequent messages to the first business process instance.

6. The system of claim 1, wherein the business process engine is configured such that, if there is an entry associated with the identity, the business process engine marks the message as associated with an existing business process instance and routes the message to the business process instance associated with the identity.

7. The system of claim 1, wherein the business process engine is a BPEL engine.

8. A method for providing BPEL support for correlation aggregation, comprising:
    providing a business process engine, executing on one or more application servers organized in a cluster, wherein each application server executes on one or more microprocessors;
    providing a database including a table which stores records relating to message groups and business process instances; and
    receiving a message by the business process engine;
    determining an identity associated with the message;
    checking the database to determine if there is an entry associated with the identity;

if there is no entry associated with the identity, then marking the message as a business process instantiating message, and instantiating a first business process instance associated with the identity; and if there is an entry associated with the identity, then routing the message to a business process instance associated with the identity.

9. The method of claim 8, further comprising:

routing the messages received by the business process engine by a business process aggregator at the business process engine.

10. The method of claim 8, wherein the identity is a correlation ID.

11. The method of claim 8, wherein the message is of a type which can instantiate a new business process instance or be routed to an existing business process instance mid-process.

12. The method of claim 8, further comprising:

when subsequent messages are received by the business process engine which share the identity with the message, routing the subsequent messages to the first business process instance.

13. The method of claim 8, further comprising:

marking the message as associated with an existing business process instance if there is an entry associated with the identity.

14. The method of claim 8, wherein the business process engine is a BPEL engine.

15. A non-transitory computer readable storage medium including instructions stored thereon which, when executed by a computer, cause the computer to perform steps comprising:

providing a business process engine, executing on one or more application servers organized in a cluster, wherein each application server executes on one or more microprocessors;

providing a database including a table which stores records relating to message groups and business process instances; and receiving a message by the business process engine;

determining an identity associated with the message;

checking the database to determine if there is an entry associated with the identity;

if there is no entry associated with the identity, then marking the message as a business process instantiating message, and instantiating a first business process instance associated with the identity; and if there is an entry associated with the identity, then routing the message to a business process instance associated with the identity.

16. The non-transitory computer readable storage medium of claim 15, further comprising:

routing the messages received by the business process engine by a business process aggregator at the business process engine.

17. The non-transitory computer readable storage medium of claim 15, wherein the identity is a correlation ID.

18. The non-transitory computer readable storage medium of claim 15, wherein the message is of a type which can instantiate a new business process instance or be routed to an existing business process instance mid-process.

19. The non-transitory computer readable storage medium of claim 15, further comprising:

when subsequent messages are received by the business process engine which share the identity with the message, routing the subsequent messages to the first business process instance.

20. The non-transitory computer readable storage medium of claim 15, further comprising:

marking the message as associated with an existing business process instance if there is an entry associated with the identity.

* * * * *

UNITED STATES PATENT AND TRADEMARK OFFICE
CERTIFICATE OF CORRECTION

PATENT NO. : 9,020,883 B2
APPLICATION NO. : 13/477892
DATED : April 28, 2015
INVENTOR(S) : Mi et al.

It is certified that error appears in the above-identified patent and that said Letters Patent is hereby corrected as shown below:

Title Page, item (56)

On page 2, column 2, under Other Publications, line 8, delete "Launchs" and insert -- Launches --, therefor.

On page 2, column 2, under Other Publications, line 9, delete "Processs" and insert -- Process --, therefor.

On page 2, column 2, under Other Publications, line 20, delete "Hamburn" and insert -- Hamburg --, therefor.

In Drawings,

On sheet 2 of 3, in figure 2, under Reference Numeral 200, line 2, delete "ins tance." and insert -- instance. --, therefor.

On sheet 2 of 3, in figure 2, under Reference Numeral 202, line 1, delete "correla tionSet" and insert -- correlation Set --, therefor.

On sheet 2 of 3, in figure 2, under Reference Numeral 202, line 2, delete "aggrega tion" and insert -- aggregation --, therefor.

On sheet 2 of 3, in figure 2, under Reference Numeral 204, line 1, delete "correlationSet" and insert -- correlation Set --, therefor.

On sheet 2 of 3, in figure 2, under Reference Numeral 204, line 1, delete "r ow" and insert -- row --, therefor.

Signed and Sealed this
Ninth Day of February, 2016

Michelle K. Lee
*Director of the United States Patent and Trademark Office*

CERTIFICATE OF CORRECTION (continued)
U.S. Pat. No. 9,020,883 B2

On sheet 2 of 3, in figure 2, under Reference Numeral 206, line 1, delete "sam e" and insert -- same --, therefor.

On sheet 2 of 3, in figure 2, under Reference Numeral 208, line 1, delete "in stance," and insert -- instance, --, therefor.

On sheet 2 of 3, in figure 2, under Reference Numeral 208, line 2, delete "insta nce." and insert -- instance. --, therefor.